March 1, 1927.  1,619,116
E. P. GRAY
AUTOMOBILE HEATER
Original Filed Feb. 17, 1923   2 Sheets-Sheet 1
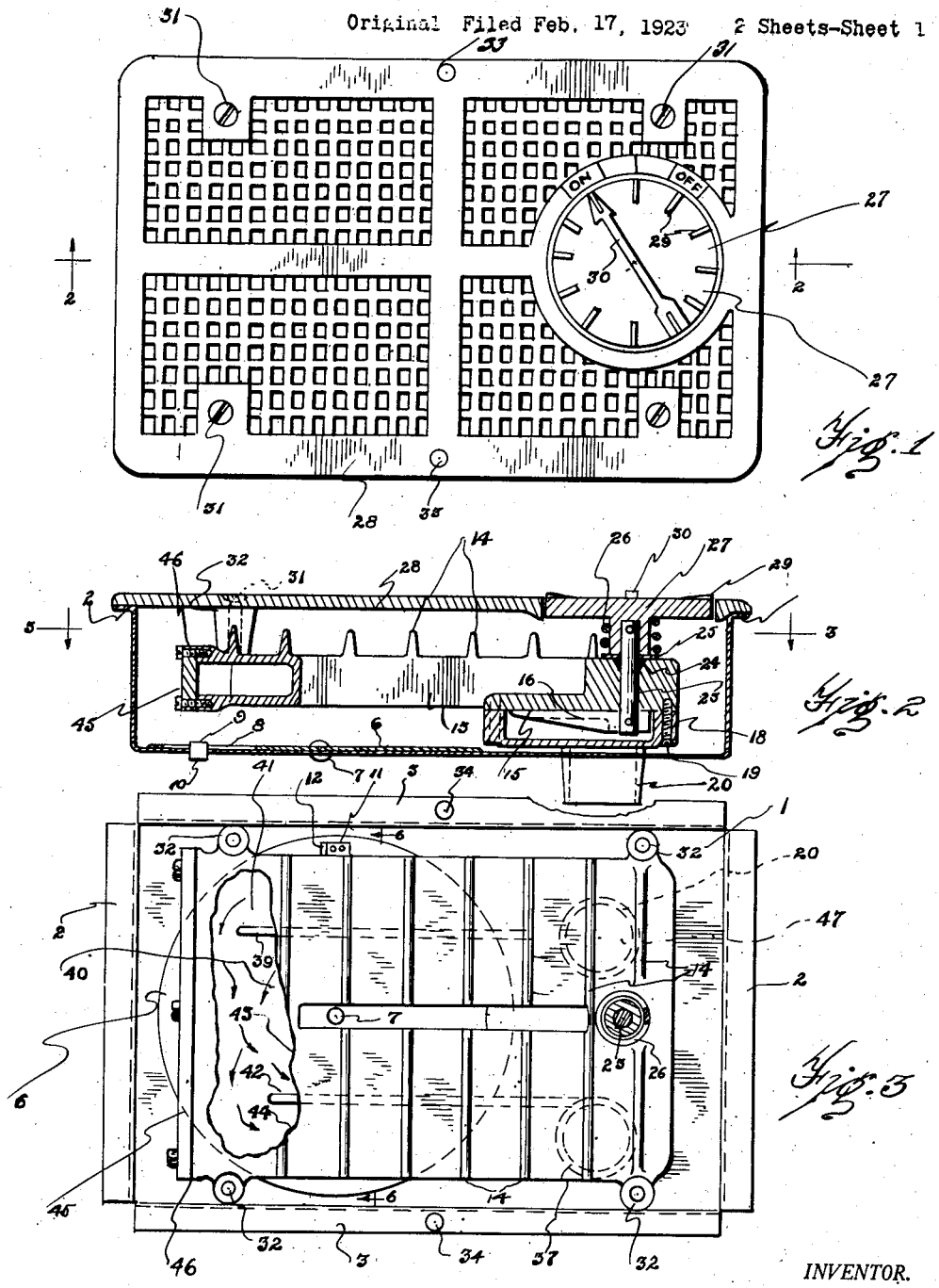
INVENTOR.
Emmet P. Gray
BY
ATTORNEY.

March 1, 1927.
E. P. GRAY
1,619,116
AUTOMOBILE HEATER
Original Filed Feb. 17, 1923    2 Sheets-Sheet 2
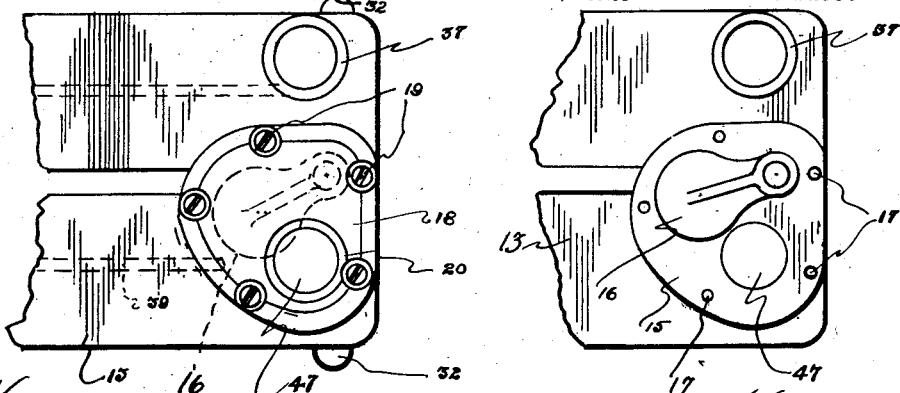
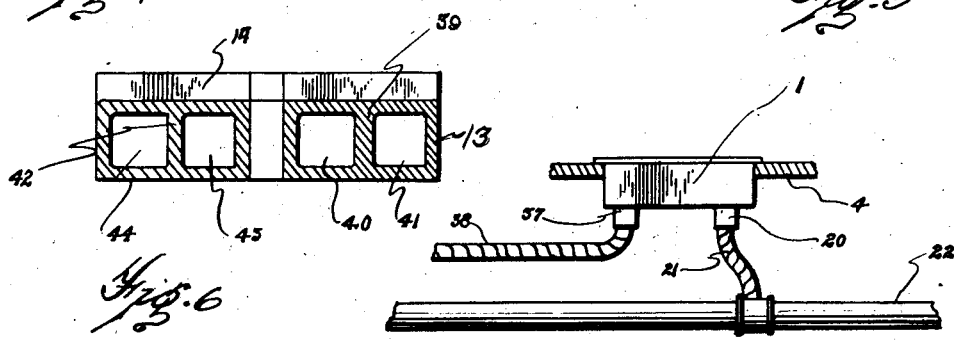
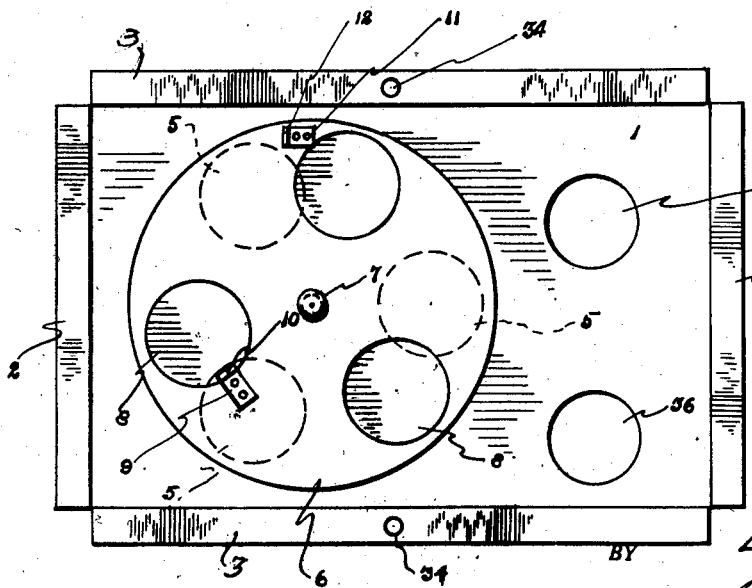
INVENTOR.
Emmet P. Gray
BY
ATTORNEY.

Patented Mar. 1, 1927.

1,619,116

UNITED STATES PATENT OFFICE.

EMMET P. GRAY, OF DETROIT, MICHIGAN.

AUTOMOBILE HEATER.

Original application filed February 17, 1923, Serial No. 619,745. Divided and this application filed October 29, 1923. Serial No. 671,315.

This invention relates to heaters and the object of the invention is to provide a heater for closed automobile bodies utilizing the exhaust gases of the automobile engine to produce heat. This application is a division of my application entitled Exhaust heater filed Feb. 17, 1923, Serial No. 619,745. Another object of the invention is to provide a heater of the character described which may also be used as a ventilator for the interior of the automobile body, the arrangement being such that heated fresh air is continually passed into th· automobile. A further object of the invention is to provide a heater from which soot may be easily removed and having an operating member which may be easily actuated to turn the heater on or off. Another object of the invention is to provide a heater arranged to prevent the sound of the explosions of the internal combustion engine from being communicated to the interior of the automobile body through the heater. A further object of the invention is to provide a heater having a casing from which dirt or other substance may be removed and in which the area of the openings for allowing an ingress of air may be adjusted. These objects and the several novel features of the invention are hereinafter more fully described and claimed, and the preferred form of construction by which these objects are attained is shown in the accompanying drawings in which—

Fig. 1 is a plan view of a heater embodying my invention.

Fig. 2 is a section taken on line 2—2 of Fig. 1.

Fig. 3 is a section taken on line 3—3 of Fig. 2.

Fig. 4 is a view of the under side of the heating chamber showing the inlet and exhaust ports.

Fig. 5 is a similar view with the intake connection removed to show the valve construction.

Fig. 6 is a section taken on line 6—6 of Fig. 3.

Fig. 7 is a view showing the connection of the heater to an exhaust pipe.

Fig. 8 is a plan view of the interior of the casing for the heater.

As shown in Figs. 2, 3 and 8, a sheet metal casing 1 is provided for the heater which is adapted to fit in a rectangular aperture provided therefor in the floor of the automobile body, and the casing 1 is provided with flanges 2 and 3 which are adapted to rest on the floor 4 of the automobile as shown in Fig. 7 to support the casing. As shown in Fig. 8, the bottom of the casing 1 is provided with a series of apertures 5 and a circular sheet metal plate 6 is pivotally mounted in the bottom of the casing 1 by means of a rivet 7. The plate 6 is provided with a series of apertures 8 and a clip 9 is secured to the plate 6 and is provided with a depending end 10 extending downwardly through one of the apertures 5. This clip 9 is adapted to engage either side of the aperture 5 to limit rotation of the plate 6 on its pivot, and the depending end 10 provides a means by which the plate 6 may be turned to the open or closed position from underneath the automobile. A lug 11 is also secured to the plate 6 and is provided with an upwardly extending end 12 by which the plate may be turned from above to the open or closed position. The heater is adapted to fit within the casing 1 and comprises a cast aluminum coil 13 having fins 14 on the upper side thereof. The heating coil 13, as shown in Fig. 5, is provided with an inlet opening 47 and the casing is provided with a flat ground face 15 about the inlet opening 47 over which a valve 16 is movable. This flat face 15 is provided with a series of threaded apertures 17 by means of which a casing 18, shown in Fig. 4, may be secured over the valve 16 by the screws 19. This valve is positioned on the under side of the heating coil and the casing 18 is provided with a depending annular flange 20 to which the inlet line 21 shown in Fig. 7 is adapted to be connected. This inlet line 21 as shown in Fig. 7 is connected to the exhaust pipe 22. As shown in Fig. 2 the valve 16 which is movable over the flat face 15 is secured to a stem 23 which is rotatably mounted in the body of the heating coil and the heating coil is provided with a conical recess in which an asbestos packing 24 is positioned to prevent leakage of the gas about the valve stem and a washer 25 is positioned over the packing 24 and is held in position by the coiled spring 26 thus preventing displacement of the packing. The stem 23 at the upper end is secured in a rotating head 27 for the valve and this rotating head 27, as shown in Figs. 1 and 2, extends flush with the floor plate 28 and is provided with lugs 29 by which the operator may position his foot on the head 27 and turn the valve to the open or closed position, the floor plate 28 being provided with the words "On" and "Off" and the valve head being provided with an arrow 30 to indicate the position of the valve as shown in Fig. 1. This floor plate 28 is provided with a grating and the heating coil is secured thereto by means of the screws 31 which connect the floor plate to the lugs 32 of the heating coil as shown in Figs. 2 and 3. The opposite sides of the floor plate as shown in Fig. 1 are provided with apertures 33 and the flanges 3 of the casing 1, shown in Fig. 3, are provided with apertures 34 and when the parts are positioned together as shown in Figs. 2 and 7 the apertures 33 and 34 are brought to registration and screws may be passed therethrough to secure the heater to the floor. The casing 1 is provided with apertures 35 and 36 shown in Fig. 8 through which the annular flange 37 about the exhaust port is connected to the tubing 38 which provides an exhaust for the heater. When the valve 16 is opened as shown in Figs. 3, 4 and 5 the exhaust gases from the exhaust pipe may pass through the inlet aperture 47 into the interior of the heating coil and the exhaust gases flowing into the heating coil are divided by the partition 39 shown in Figs. 3 and 6 and flow through the two chambers 40 and 41 thus formed. The partition 39, as shown in Fig. 3, terminates short of the end of the casing and allows the gas to pass from the chamber 41 around the end of the partition 39 where it is again divided by the partition 42 and the gas flowing through the chamber 40 is also further broken up and divided by the partition 42 so that the gases pass through the chambers 43 and 44 thus formed and out through the exhaust port 37. The partition 42 extends to the end of the exhaust port 37 as shown in Fig. 3 so that the gases in the chamber 43 have slightly further to travel than the gases in the chamber 44 and prevents the gases from favoring one chamber or the other in passing to the exhaust port. In passing through this heater the gases are broken up and expanded so that the heater acts similar to a muffler and reduces the sound of the separate explosions. It will be noted from Figs. 2 and 3 that the heating coil is provided with an end plate 45 which is bolted in place and is provided with a packing 46 to prevent leakage of exhaust gases. By removing the bolts the plate 45 may be removed to allow the chambers 40, 41, 43 and 44 to be easily cleaned out with a wire brush to remove soot and carbon deposits which sometimes accumulate in sufficient quantities to clog up the passageways particularly when used with an engine which tends to pump oil.

The operation of the device is very simple as it is only necessary to place the foot on the circular member 27 and give a slight turn to open the valve. At this time the heated gases from the exhaust pipe flow in through the inlet aperture 47, chambers 40 and 41, thence through the chambers 43 and 44 and through the exhaust tube 38 to atmosphere. By turning the disc 6 so that the apertures 8 register with the apertures 5 a ventilator is provided for the automobile which will be understood more particularly from Fig. 2. As the heating coil 13 becomes hot the air thereabout is heated and passes up through the apertured floor plate 28 and as this air passes upwardly fresh air is drawn upwardly through the apertures 5 and 8 about the heating coil and thence to the interior of the automobile. The disc 6 may be turned to regulate the size of the openings provided by the apertures 5 and 8 so that the supply of fresh air admitted to the automobile body may be regulated to a nicety and when the disc 6 is in the open position any dirt or foreign matter falling through the grating is moved about by the vibrations of the automobile and drop out through the apertures 5 and 8.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. A heater for utilizing the exhaust gases of an internal combustion engine, comprising a hollow casing, a floor plate secured to the top of the casing and having a multiplicity of apertures therethrough open to the casing, a hollow U-shaped conduit for exhaust gases having the legs thereof arranged in a horizontal plane, a partition in each leg forming longitudinal chambers in the interior, said conduit having an inlet port at the end of one of the legs, an exhaust port at the end of the other leg, the bottom of the casing being provided with a pair of apertures each substantially in registration with a port, a hollow member covering the inlet port and providing a chamber formed with a hollow extension for connection of a conduit, a valve mounted in the said chamber movable in a horizontal plane to cover or uncover the said inlet port, a valve operating plate rotatably mounted in an aperture therefor provided in the floor plate, and a vertical rod connecting the plate with the said valve.

2. A heater for utilizing the exhaust gases of an internal combustion engine comprising a hollow casing, an apertured floor plate providing a cover therefor, a heating element therein consisting of a hollow U-shaped conduit through which the exhaust gases may pass, said conduit having an inlet port on one side of one end and an exhaust port on the same side of the opposite end, the inlet port having a raised wall provided with a ground face about the inlet port, the two legs of the said conduit being spaced apart for the major portion of their length and occupying substantially the same horizontal plane, a partition in each leg of the said conduit extending part way of the length thereof providing two chambers in each leg both open to a common passageway connecting the legs, a valve movable to cover or uncover the said inlet port, a spring for holding the valve in contact with the ground face about the inlet port, a detachable casing housing the valve providing for the connection of an exhaust conduit, and a rotatable valve operating plate supported in the floor plate.

3. A heater for utilizing the exhaust gases of an internal combustion engine comprising a hollow casing, a heating element therein consisting of a hollow conduit through which the exhaust gases may pass, said conduit having an inlet port at one end and an exhaust port at the other, a recessed casing attached to the inlet port end of the conduit and providing a chamber thereabout, said second casing being formed for the attachment of an exhaust gas conduit, the wall of the inlet end of the conduit within the said chamber having an aperture at one side of the interior of the chamber, a valve plate rotatable upon the said wall and adapted to be turned to cover or uncover the said opening, a stem extending upwardly from the said valve, and means connected with the stem for operating the valve.

In testimony whereof, I sign this specification.

EMMET P. GRAY.